United States Patent [19]
Murata

[11] Patent Number: 5,748,774
[45] Date of Patent: May 5, 1998

[54] IMAGE PROCESSING METHOD AND APPARATUS HAVING A PLURALITY OF IMAGE PROCESSING MODES

[75] Inventor: Yukio Murata, Yokohama, Japan

[73] Assignee: Canon Kabushiki Kaisha, Tokyo, Japan

[21] Appl. No.: 448,301

[22] Filed: May 23, 1995

Related U.S. Application Data

[63] Continuation of Ser. No. 51,553, Apr. 23, 1993.

[30] Foreign Application Priority Data

Apr. 28, 1992 [JP] Japan .................................. 4-109571

[51] Int. Cl.⁶ .................................. H04N 1/40; H04N 1/32; G06K 9/00
[52] U.S. Cl. .................................. 382/181; 358/448; 358/462; 358/468
[58] Field of Search .................................. 358/445, 462, 358/465, 466, 467, 447, 500, 501, 441, 434, 435, 436, 437, 438, 439, 468; 399/84, 85; 382/317, 181

[56] References Cited

U.S. PATENT DOCUMENTS

| | | | |
|---|---|---|---|
| 5,161,037 | 11/1992 | Saito | ............ 358/468 |
| 5,224,180 | 6/1993 | Tadokoro | ............ 382/61 |
| 5,247,371 | 9/1993 | Hikawa et al. | ............ 358/448 |
| 5,274,468 | 12/1993 | Ojha | ............ 358/448 |

FOREIGN PATENT DOCUMENTS

| | | | |
|---|---|---|---|
| 392781 | 10/1990 | European Pat. Off. | ......... H04N 1/40 |
| 415648 | 3/1991 | European Pat. Off. | |
| 63-205238 | 8/1988 | Japan . | |
| 63-237661 | 10/1988 | Japan | ............ H04N 1/100 |
| 2050857 | 2/1990 | Japan | ............ B41J 2/52 |
| 2150861 | 6/1990 | Japan | ............ G03G 15/00 |

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

An image processing apparatus includes a process mode setting unit which sets a process condition for image reading such as edge emphasis degree, selection of binarization or pseudo-halftone processing, and a threshold level of a binarizer/pseudo-halftone processor. In the processing of an original including an OCR sheet as the first sheet, the process mode setting unit sets a process condition corresponding to an OCR reading for the OCR sheet, and for the next sheet, the unit changes the process condition appropriate to a reading mode designated by a user. Thus, the apparatus realizes image reading having excellent reproductivity, while preventing erroneous recognition during OCR reading.

46 Claims, 6 Drawing Sheets

IMAGE PROCESSING METHOD AND APPARATUS HAVING A PLURALITY OF IMAGE PROCESSING MODES

This application is a continuation of application Ser. No. 08/051,553 filed Apr. 23, 1993.

BACKGROUND OF THE INVENTION

The present invention relates to an image processing method and apparatus which comprise a plurality of image process modes and, more particularly, to an image processing method and apparatus applied to a facsimile apparatus having a plurality of image process modes for processing read original read image data.

As facsimile apparatus have rapidly permeated offices and established a status of being indispensable, efforts have been made to develop its function and reduce costs while providing facsimiles from the high-end to low-end.

As one of the various developed functions, mark sheet (=Optical Character Reader (OCR) sheet) input has been provided for simplifying the manual dialing operation. A dialing number of the destination apparatus on a mark sheet can be read from the mark sheet and automatically transmitted to the destination apparatus. Upon multi-destination delivery, once a mark sheet script is made, for the next time, the operations become very easy. Further, a specific operation can be simplified by preparing a mark sheet script.

On the other hand, various image processing methods upon image reading have been provided, e.g., "picture model" (mode for processing a picture image) and edge emphasis for reproducing various original images in high-quality.

In this manner, the image reproductivity has been improved as image processing methods progress. As a result, a problem occurs upon reading an OCR script marked with a pencil, i.e., even a vague white spot (drop out/in as an image noise) and a black spot (dot(s) as an image noise) in the script are read as significant data, causing a recognition error of an OCR sheet.

If parameters for image processing are changed to prevent such inconvenience, the image reproductivity of the other original images is degraded.

SUMMARY OF THE INVENTION

In view of the aforementioned problems, an object of the present invention is to provide an image processing method and apparatus which can change an image process mode based on the amount of processed image data when the image data is processed, while having excellent image reproductivity.

In order to attain the foregoing object, an image processing apparatus according to the present invention comprises: setting means for setting plural kinds of image process modes used upon in processing image data; process means for performing image processing using one of the process modes set by the setting means; and changeover means for changing over the process mode used by the process means to another process mode based on amount of image data processed by the process means.

Further, to attain the foregoing object, an image processing method according to the present invention comprises: a setting step of setting plural kinds of image process modes used upon processing of image data; a process step of performing image processing using one of the process modes set by said setting means; and a changeover step of changing over the process mode used by said process means to another process mode based on amount of image data processed by said process means.

In accordance with the present invention as described above, the image process mode can be changed over based on the amount of processed image data, e.g. the number of pages. The changeover of a process mode can be performed in page units, corresponding to image type. Accordingly, the image processing in an appropriate image process mode corresponding to image type can be made with excellent reproductivity.

It should be noted that the "image process model" in the present invention generically represents a reading process mode set based on such as presence/absence of halftone processing, edge emphasis degree, and a binarization threshold level.

The invention is particularly advantageous since the image processing method and apparatus can be applied to a facsimile apparatus to prevent a recognition error of a mark sheet by changing over the process mode between a mark sheet script and the next normal script, while reproducing a normal original image having high quality.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

[First Embodiment]

Figure 1:
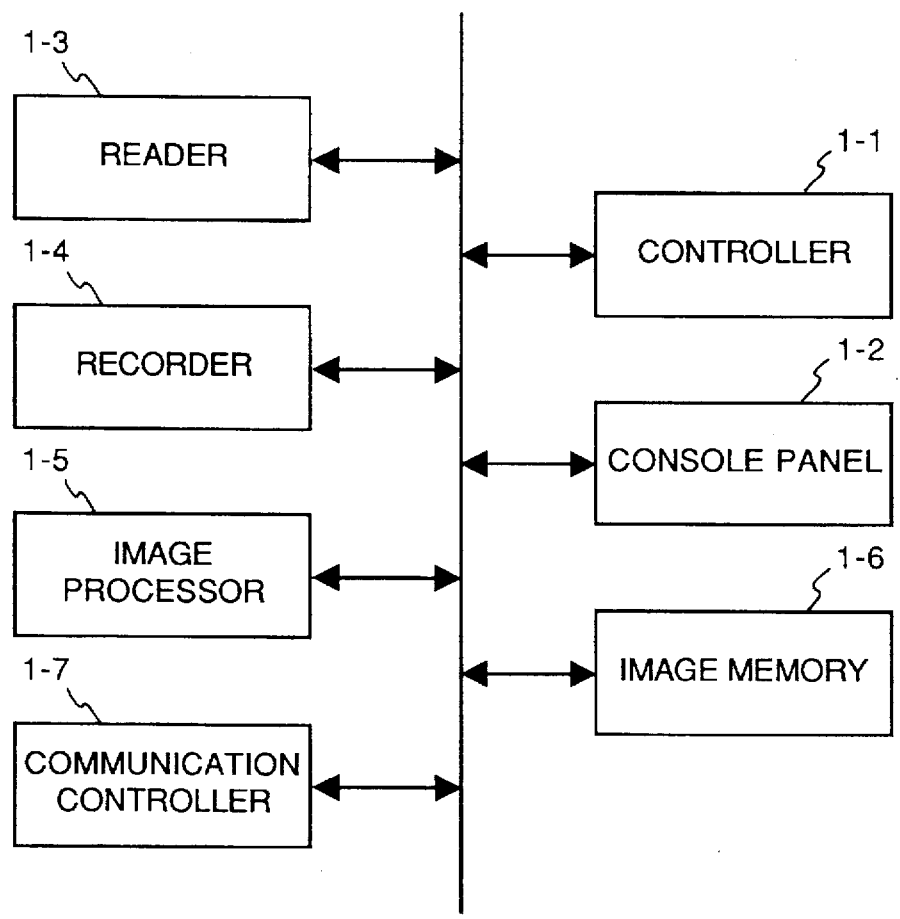
FIG. 1 is a block diagram showing the configuration of an image processing apparatus according to a first embodiment of the present invention.

FIG. 1 is a block diagram showing the configuration of an image processing apparatus according to a first embodiment of the present invention. The general operation of the embodiment will be described below with reference to FIG. 1.

In FIG. 1, reference numeral 1-1 denotes a controller comprising a microcomputer circuit having a CPU, a ROM, a RAM, a clock IC, an I/O and a CG-ROM; 1-2, a console panel comprising various keys for key-input and a display; and 1-3, a reader comprising a CCD (Charge Coupled Device) circuit, an AD converter, an image process circuit.

The controller 1-1 controls the overall apparatus and various data by software control of the microcomputer. The console panel 1-2 displays various information for an operator, who designates an image process mode (hereinafter, referred to as "reading mode") through the console panel 1-2. Further, setting of an "OCR mode" (mode for processing an OCR script) is made using the console panel 1-2. Note that these modes will be described in detail later. The reader 1-3 performs image processing such as photoelectric conversion, AD conversion, image correction and binarization of optically-read data.

Numeral 1-4 denotes a recorder comprising an image output device such as a thermal-printer and a laser-beam printer; 1-5, an image processor; 1-6, an image memory; and 1-7, a communication controller comprising a line interface and a telephone circuit.

The recorder 1-4 outputs image data read by the reader 1-3, received image data and image data formed by the controller 1-1. The image processor 1-5 controls coding of the image data read by the reader 1-3 into compressed code data, decoding of received compressed code data into still-image data, and image reduction/magnification. The read image data, the coded data, the received code data and the decoded still-image data are stored in the image memory 1-6. The communication controller 1-7 controls transmission/reception of image data and communication control data, calling, and reception of incoming-calls.

Figure 2:
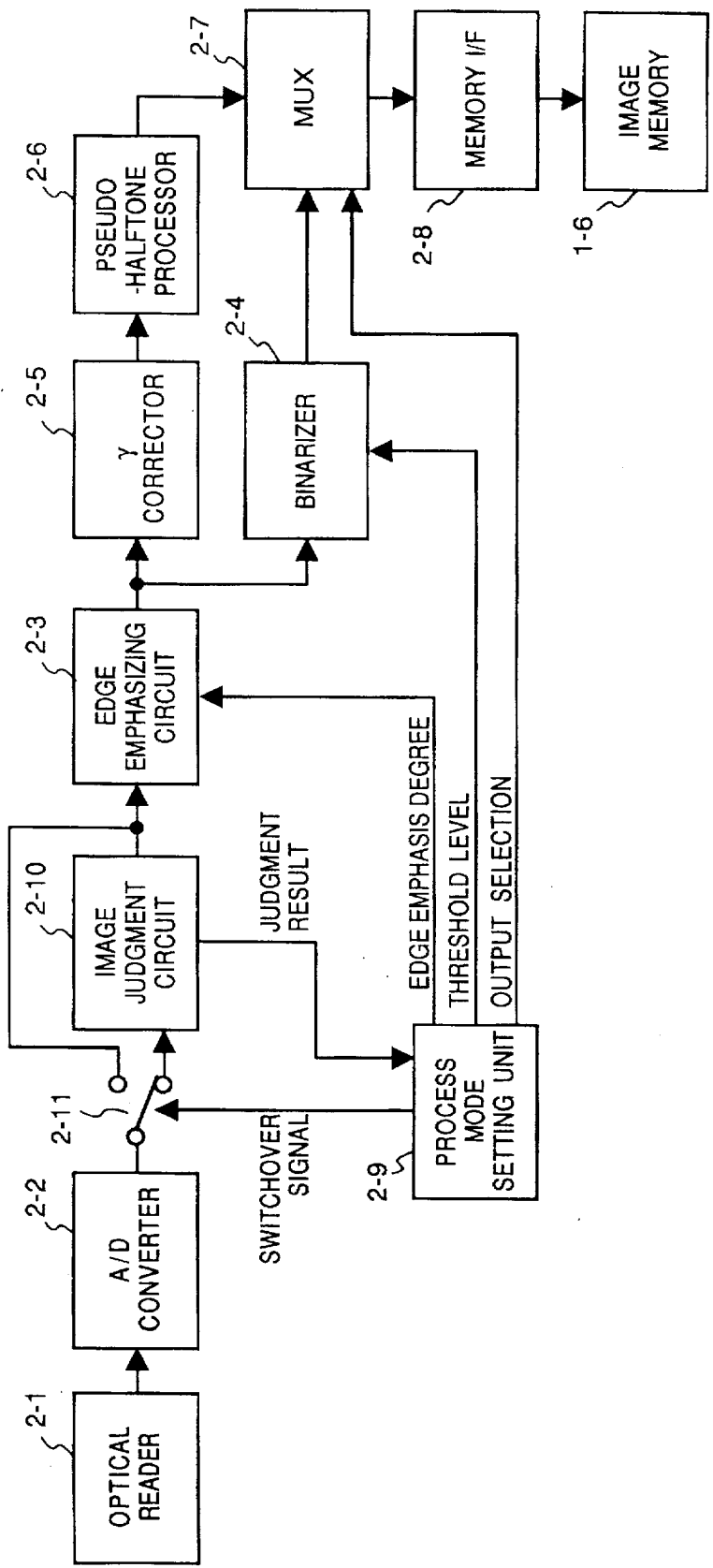
FIG. 2 is a block diagram showing in detail the configuration of the reader 1-3 of the apparatus in FIG. 1.

FIG. 2 shows in detail the configuration of the reader 1-3.

In FIG. 2, numeral 2-1 denotes an optical reader which optically reads an original image by the CCD circuit, performs photoelectric conversion to the read data, and outputs the converted data; 2-2, an A/D converter which converts an analog signal output by the optical reader 2-1 into a multi-level digital signal; 2-3, an edge emphasizing circuit which performs an edge emphasizing process to the multi-level digital signal in accordance with a set parameter; 2-4, a binarizer which converts multi-level data into binary data in accordance with a set parameter (threshold level); 2-5, a γ corrector which corrects multi-level data in accordance with a set γ correction table; 2-6, a pseudo-halftone processor which converts input multi-level image data into binary data using, e.g., the error diffusion method; 2-7, a multiplexer which selects either of the binary data output from the pseudo-halftone processor 2-6 or the binary data output from the binarizer 2-4 and outputs the selected data; 2-8, a memory I/F which serves as an interface for the image memory 1-6 for storing the binarized image data.

Numeral 2-10 denotes an image judgment circuit which judges the type of image data output from the A/D converter 2-2 to the edge emphasizing circuit 2-3 per each pixel. More specifically, the image judgment circuit 2-10 extracts 3×3 matrix image data (image area) composed of an object pixel to be output to the edge emphasizing circuit 2-3 and the neighboring eight pixels from the A/D converter 2-2, and judges the type of the extracted image data. The image type judgment is performed with respect to 3×3 image area units. The judgment result of each matrix is output to a process mode setting unit 2-9, and the central pixel data in the matrix is output to the edge emphasizing circuit 2-3. The image judgment circuit 2-10 judges an extracted matrix as picture image data if the difference between the pixel data within the matrix is small, while it judges the matrix as character image data if the difference is large. The image judgment circuit 2-10 functions when a "character/picture mode", appropriate for reading script which includes both characters and picture (s), is designated.

The process mode setting unit 2-9 sets process conditions such as edge emphasis degree in the edge emphasizing circuit 2-3, a parameter (threshold level) in the binarizer 2-4, selection of the multiplexer 2-7 output (binarized data or pseudo-halftone processed data) in accordance with a reading mode designated at the console panel 1-2.

Numeral 2-11 denotes a switch which switches over image data flow in accordance with a switchover signal from the process mode setting unit 2-9. If the switchover signal is "ON" (1), image data output from the A/D converter 2-2 is input into the image judgment circuit 2-10. If the switchover signal is "OFF" (0), the image data from the A/D converter 2-2 is input into the edge emphasizing circuit 2-3.

If the reading mode designated at the console panel 1-2 is the "character/picture mode", the process mode setting unit 2-9 sets the switchover signal to "1" (ON) so that the image data can be input into the image judgment circuit 2-10. The image judgment circuit 2-10 performs image type judgment to the input image data in image area units.

The control operation of the reader 1-3 having the above construction will now be described. The reader 1-3 can perform image processing corresponding to OCR reading by a process condition set by the process mode setting unit 2-9. In this embodiment, as an example of the process condition appropriate to the OCR reading, parameters are set to lower the edge emphasis degree and lower the threshold level in the binarization so as to read image data in a higher density from the original. The multiplexer 2-7 selects the binarizer 2-4 output and outputs the selected data. The above process condition can prevent reading of a white spot in a black portion and a black spot in a white portion which may cause a recognition error.

Regarding the next and the subsequent sheets of original script, the process mode setting unit 2-9 changes the parameters of a process condition in accordance with a reading mode designated in advance by the user through the console panel 1-2. For example, if the designated reading mode is a "character mode" (mode for reading character script), the process mode setting unit 2-9 sets the switchover signal to "0" (OFF) to switch over the switch 2-11 to select the edge emphasizing circuit 2-3 so as to input image data from the A/D converter 2-2 into the edge emphasizing circuit 2-3. The process mode setting unit 2-9 raises the edge emphasis degree of the edge emphasizing circuit 2-3 and sets the threshold level of the binarizer to a normal value (e.g., 36th level in the case when the image data is 6 bits i.e. 64 levels), further, the process mode setting unit 2-9 sets the multiplexer 2-7 to select an output signal from the binarizer 2-4. If the mode is a "picture mode" (mode for reading picture script), the process mode setting unit 2-9 lowers the edge emphasis degree and sets the multiplexer 2-7 to select the pseudo-halftone processor 2-6 output. If the "character/picture mode" is designated, the process mode setting unit 2-9 sets the switchover signal to "1" (ON) so as to connect the image judgment circuit 2-10 and the A/D converter 2-2 via the switch 2-11. The process mode setting unit 2-9 switches over the process condition in accordance with image type judgment results in image area units from the image judgment circuit 2-10. More specifically, if the judgment result in an image area is a character image, the process mode setting unit 2-9 sets the process condition for the character mode. If the judgment result is a picture image, the process mode setting unit 2-9 sets the process condition for the picture mode.

As described above, the process mode setting unit 2-9 sets an appropriate process condition for the second and the subsequent sheets, to perform image processing with excellent image reproductivity. It should be noted that the description of types of reading modes and setting of parameters for the process condition is one example only and does not pose any limitation relative to the scope of the present invention.

Next, image reading operation including the control operation of the reader 1-3 will be described with reference to the flowchart of FIG. 3.

Figure 4:
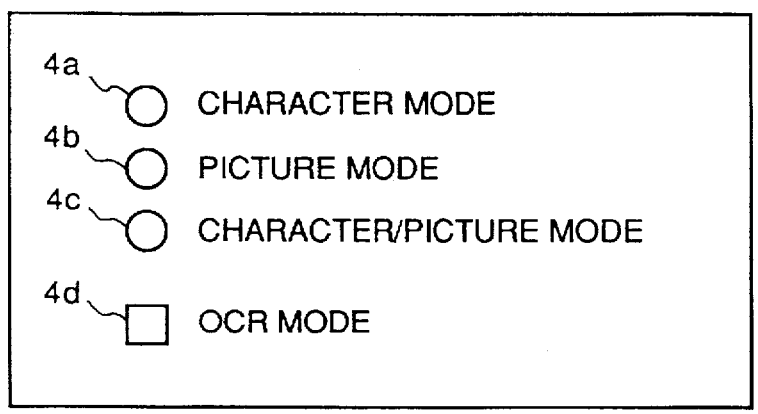
FIG. 4 illustrates a example of a part of an console panel for selecting an image reading mode.

At first, a determination is made as to whether or not the "OCR mode" is performed in step S1. The OCR mode is designated by key-input at the console panel 1-2 or by selection of a software switch by the controller 1-1. In the embodiment, the OCR mode is designated by pressing of selection key 4d on the console panel 1-2 as shown in FIG. 4. The controller 1-1 examines the designation and determines whether or not the designated mode is the OCR mode. If NO, normal reading process is performed in step S2.

If YES, the condition for the OCR reading is set by the process mode setting unit 2-9 in step S3. More specifically, parameters appropriate to OCR reading are set to the respective elements in FIG. 2. In step S4, reading of the first script sheet is performed with parameters appropriate to the OCR reading. In step S5, whether or not the reading is finished is determined. If the reading is finished and the read image data is stored in the image memory 1-6, and the process proceeds to step S6 for reading the next script sheet.

In step S6, the parameters corresponding to a reading mode which has been selected by the user in advance are set to the respective elements in FIG. 2 by the process mode setting unit 2-9. In step S7, reading of the second sheet is performed. In step S8, whether or not the reading of the second sheet is finished is determined. If YES, the process proceeds to step S9.

If the user has designated the "character mode" or the "picture model" in advance, the switchover signal to the switch 2-11 is set to "0" (OFF) by the process mode setting unit 2-9 in step S6. As the image judgment circuit 2-10 is not selected, the image type judgment in image area units is not performed.

If the "character/picture mode" is designated as the reading mode, the switchover signal is set to "1" (ON) by the process mode setting unit 2-9 in step S6 to select the image judgment circuit 2-10. While the image reading is performed in step S7, the image type of the sheet is judged in image area units by the image judgment circuit 2-10. The process parameters (for character mode or picture mode) are successively set by the process mode setting unit 2-9 based on the judgment results.

In step S9, whether or not there are other sheets to be read is examined. If YES, the process returns to step S7 to perform reading of the next sheet. In this case, the original is read in the process condition set in step S6. If NO in step S9, operations such as image processing by the image processor 1-5 and transmission to the destination facsimile apparatus are performed.

In this embodiment, selection keys 4a to 4d as shown in FIG. 4 are provided for easy manual operation. The user can select a reading mode appropriate to each original with these selection keys. Conversely, the manual operation can be complicated for a more detailed instruction.

In this embodiment, the image data processing is started after the reading of the whole pages has been completed. However, the present invention is not limited to this arrangement. The image processor 1-5 may perform image processing each time data for one page has been read. Further, each time image data for one page has been read, the image processor 1-5 may process the image data and the communication controller 1-7 can perform transmission.

As described above, the facsimile apparatus according to the embodiment, having a plurality of image reading modes and reading densities, can change over the image reading mode and the reading density between the first sheet and the second sheets of an original in accordance with the reading mode designation through a predetermined switch.

In the case where the first sheet of the original is an OCR sheet, the present invention prevents erroneous recognition in OCR reading by designation of a reading mode appropriate to the OCR reading. The second and the subsequent sheets are read in the reading mode and the reading density designated by the user. Thus, excellent image reproductivity can be maintained.

Accordingly, the present invention can solve the disadvantage of the conventional OCR reading, and can utilize image reading modes which provide excellent image reproductivity.

[Second Embodiment]

In the first embodiment, if the "character/picture mode" is selected, the image judgment circuit 2-10 performs image type (character/picture) judgment in image area units, and the process mode setting unit 2-9 sets process condition based on the judgment results. In this embodiment, an image processing apparatus which sets process condition appropriate to the "character/picture mode" for processing an image including both characters and picture(s) will now be described. It should be noted that the apparatus has the same construction as the image processing apparatus in the first embodiment, and the explanation of the configuration of the apparatus will be omitted.

Figure 5:
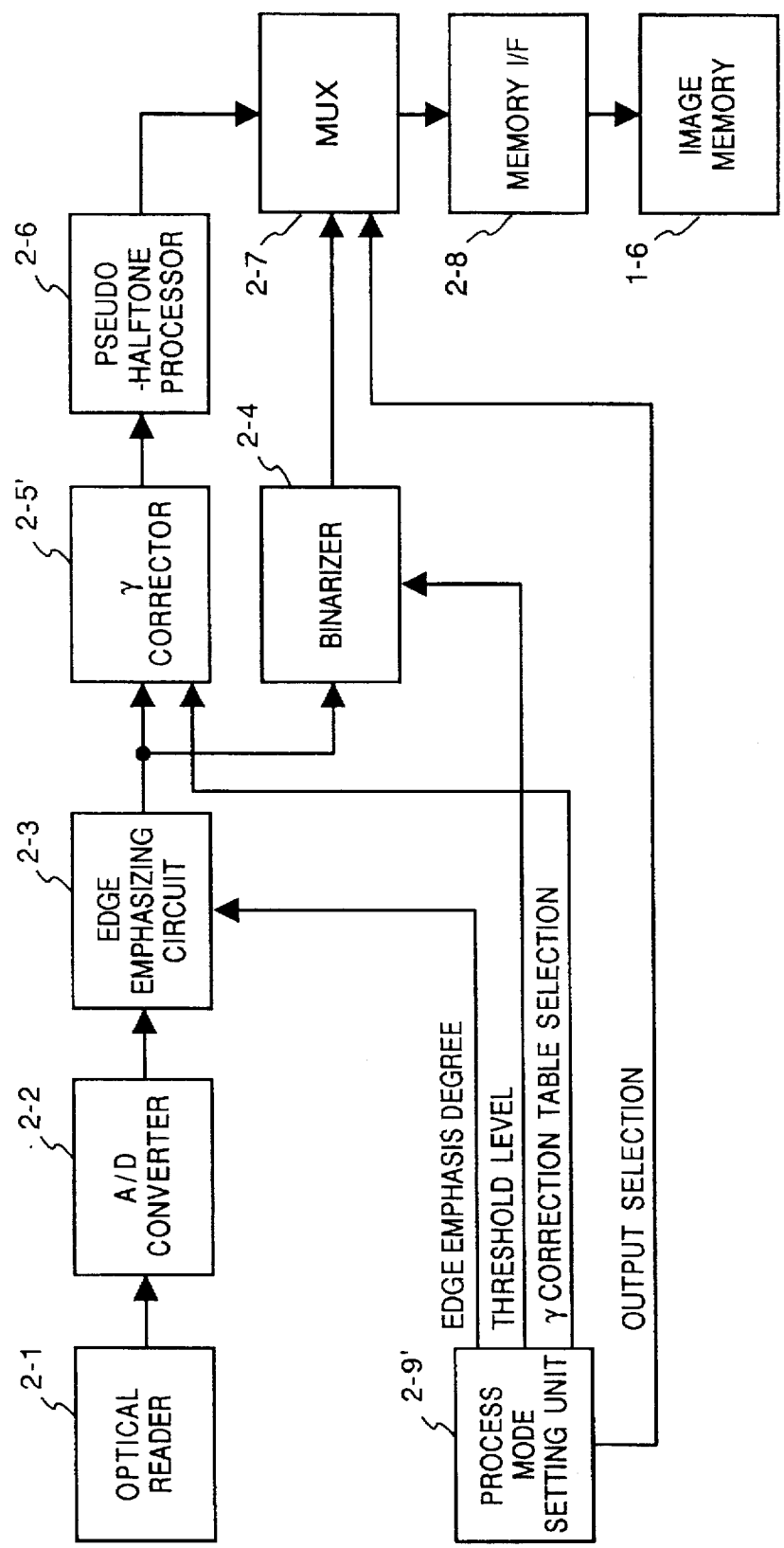
FIG. 5 is a block diagram showing the configuration of the reader 1-3 of an image processing apparatus according to a second embodiment.
Figure 6A:
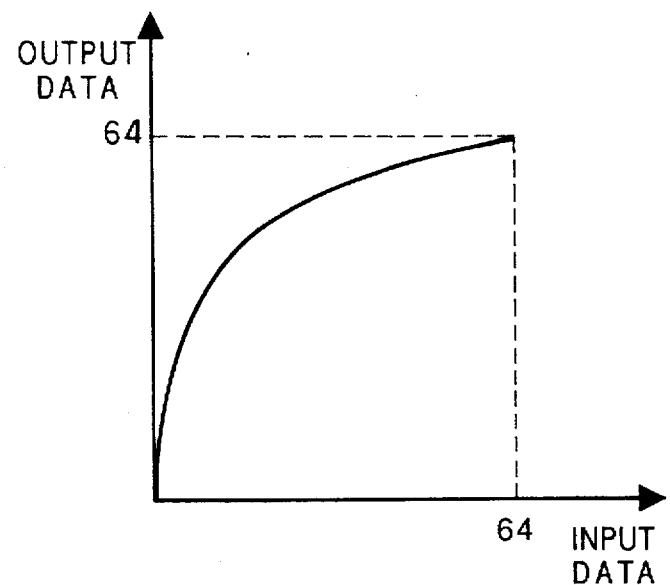
FIGS. 6A and 6B show input/output characteristics of γ correction tables in the γ corrector 2-5 shown in FIG. 5.
Figure 6B:
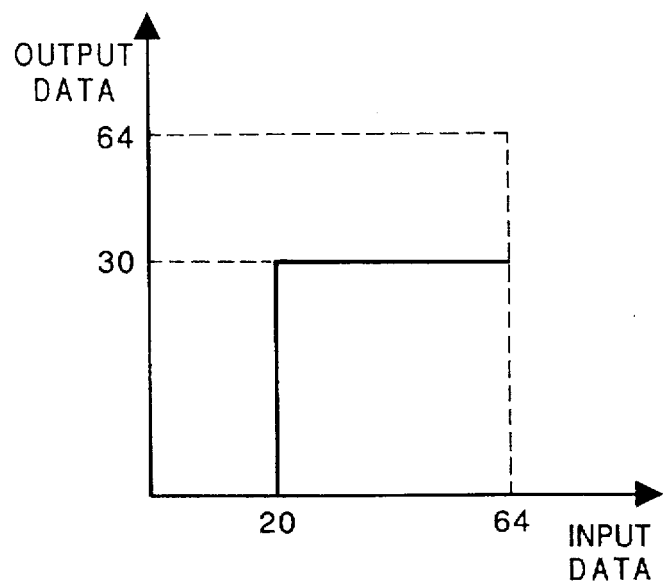

FIG. 5 is a block diagram showing the configuration of the reader 1-3 of an image processing apparatus according to the second embodiment. In FIG. 5, elements corresponding to those in FIG. 2 have the same reference numeral and the explanations of those elements will be omitted. Reference numeral 2-9' denotes a process mode setting unit which, based on a designated reading mode, sets the edge emphasis degree in the edge emphasizing circuit 2-3 and a threshold level in the binarizer 2-4, and selects a γ correction table of the γ corrector 2-5' and the multiplexer 2-7 output. The γ corrector 2-5' which performs γ correction to input image data has a γ correction table for the "picture mode" having an input/output characteristic as shown in FIG. 6A and a γ correction table for the "character/picture mode" having an input/output characteristic as shown in FIG. 6B. The process mode setting unit 2-9' outputs a γ table switchover signal to select one of these tables.

In this embodiment, process conditions for OCR reading, the "character mode" and the "picture mode" are set similarly to the first embodiment. However, the process condition setting in the "character/picture mode" is different from that in the first embodiment.

If the "character/picture mode" is designated, the process mode setting unit 2-9' sets the edge emphasis degree in the edge emphasizing circuit 2-3 to a lower level, and selects the γ correction table of FIG. 6B. The γ corrector 2-5' using this γ correction table (FIG. 6B) outputs input data of density levels equal to/less than 19 as the 0 level, and outputs all input data of density levels more than 19 as level 30 data. The pseudo-halftone processor 2-6 halftone-processes the image data converted by the γ corrector 2-5'. The process mode setting unit 2-9 sets the multiplexer 2-7 to select the pseudo-halftone processor 2-6 output and the data from the pseudo-halftone processor 2-6 is stored in the image memory 1-6. In this manner, an image process appropriate to an image including both characters and picture(s) can be performed.

Figure 3:
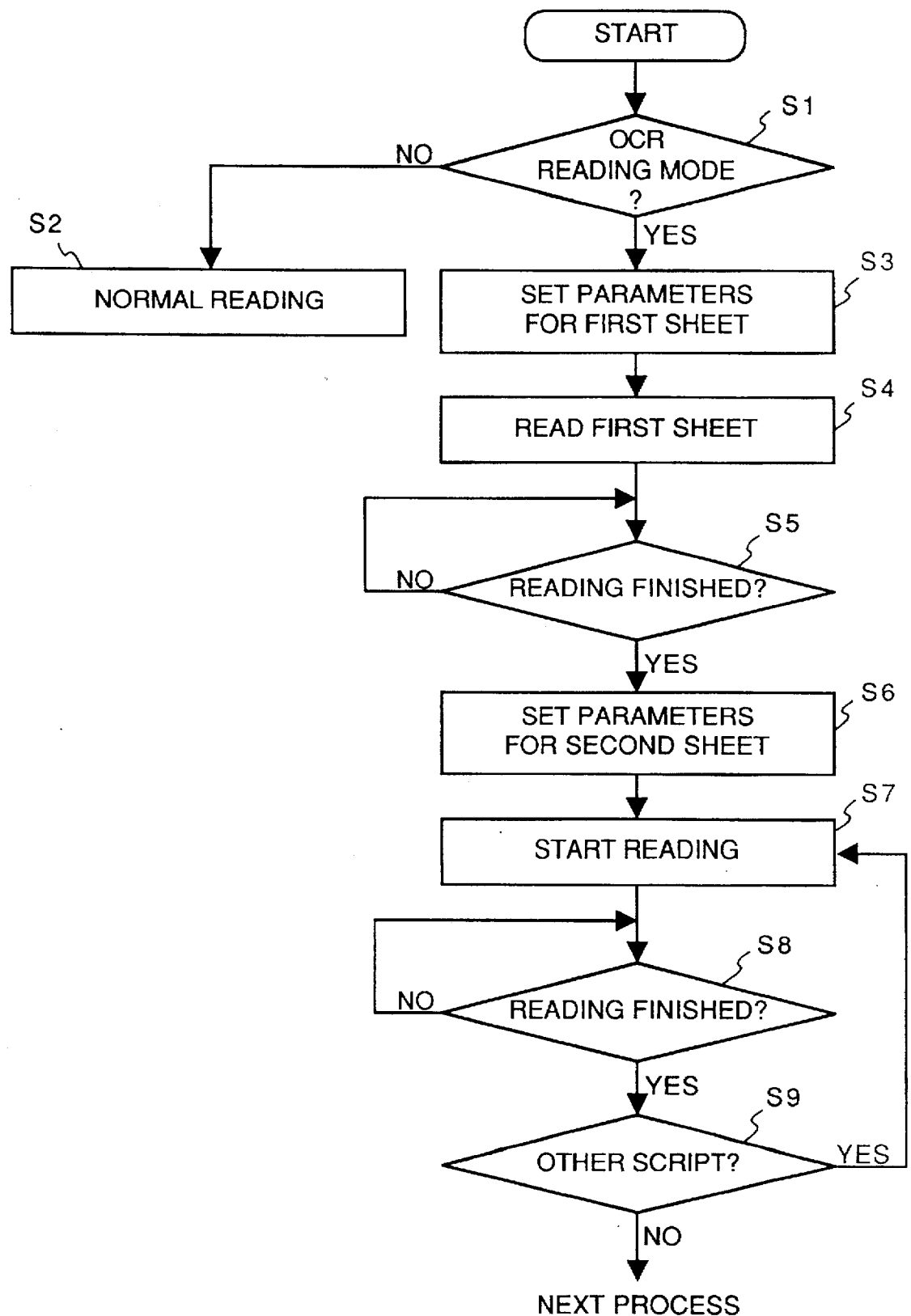
FIG. 3 is a flowchart showing reading control in the embodiment.

It should be noted that the process in the second embodiment is also performed in accordance with the flowchart of FIG. 3. However, in case the "character/picture mode" has been designated in advance, the process mode setting unit 2-9 sets the above-described process condition in step S6.

According to the second embodiment, an image type judgment in image area units as in the first embodiment is not required. Consequently, the image judgment circuit 2-10 in the first embodiment is not necessary, thus the configuration can be simplified and manufacturing costs can be reduced.

It should be noted that the γ correction table of FIG. 6B for the "character/picture model" is merely one example and various modification to this table can be considered.

Further, as the "character/picture mode" process condition, the edge emphasis degree in the edge emphasizing circuit 2-3 can be set to a higher level. In this case, the γ corrector 2-5' can use the γ correction table for the "picture mode" (FIG. 6A).

As described above, the image processing method and apparatus according to the present invention can realize reading in an appropriate process mode and perform image processing having excellent image reproductivity.

The present invention can be applied to a system constituted by a plurality of devices, or to an apparatus comprising a simple device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

setting means for manually setting at least one of plural kinds of image generation modes in advance of generating image data;

input means for inputting an original image;

generation means for generating image data based on the original image input by said input means using either the image generation mode set by said setting means or another image generation mode in which image data suitable for a recognition process is generated;

discriminating means for discriminating whether or not the recognition process is to be applied to the original image input by said input means; and control means for controlling a changeover of the image generation mode used in said generation means, between the image generation mode set by said setting means and the another image generation mode, in accordance with a discrimination result by said discrimination means, while the image data is generated by said generation means.

2. The apparatus according to claim 1, further comprising judging means for judging if the amount of image data generated by said generation means equals a predetermined amount, wherein said control means controls the changeover of generation modes based on a judgment by said judging means and a discrimination result by said discrimination means.

3. The apparatus according to claim 2, wherein said generating means generates image data in page units, and said judging means judges if the number of pages of the image data generated by said generation means equals a predetermined number of pages.

4. The apparatus according to claim 3, wherein said predetermined number of pages is one, and said control means controls to change over the image generation mode used by said generating means between image data of a first page and image data of a second page.

5. The apparatus according to claim 4, wherein the image generation mode used for generating image data of the first page is an image generation mode appropriate to mark sheet reading.

6. The apparatus according to claim 1, wherein said generating means generates image data from image data obtained by reading images.

7. The apparatus according to claim 1, wherein said setting means sets at least one of edge emphasis degree, a threshold level for binarization and a binarization method.

8. The image processing apparatus as recited in claim 1, wherein said image processing apparatus is included in a facsimile apparatus.

9. An image processing apparatus comprising:

setting means for setting at least one of plural kinds of binarization modes in advance of binarizing an image;

input means for inputting multi value image data;

binarization means for binarizing the multi value image data input by said input means using either the binarization mode set by said setting means or another binarization mode in which binarized data suitable for a recognition process is generated;

judging means for judging if the amount of the image data binarized by said binarization means equals a predetermined amount of pages;

first discriminating means for discriminating whether or not the recognition process is to be applied to the image data input by said input means; and changeover means for controlling changeover of the binarization mode used in said binarization means, between the binarization mode set by said setting means and the another binarization mode based on a judgment by said judging means and a discrimination result by said first discriminating means.

10. The apparatus according to claim 9, further comprising second discriminating means for extracting a predetermined size partial image from the image data, and discriminating a type of the partial image, wherein said setting means sets at least one of edge emphasis degree, a threshold level in binarization, and a binarization method based on the type of the partial image discriminated by said second discriminating means.

11. The apparatus according to claim 9, wherein said setting means sets binarization modes in page units, said input means inputs the image data in page units, said judging means judges if a number of pages of the image data binarized by said binarization means equals a predetermined number of pages, and said changeover means controls the changeover of the binarization mode used by said binarization means, between the binarization mode set by said setting means and the another binarization mode, in page units based on a judgment of said judging means and a discrimination result by said discriminating means.

12. The apparatus according to claim 11, wherein said predetermined number of pages is one, and said changeover means changes over the binarization mode used by said binarization means between image data of a first page and image data of a second page.

13. The apparatus according to claim 12, wherein the binarization mode used for binarizing the image data of the first page is a binarization mode appropriate to mark sheet reading.

14. The apparatus according to claim 9, wherein said input means reads an original image.

15. The image processing apparatus as recited in claim 9, wherein said image processing apparatus is included in a facsimile apparatus.

16. An image processing apparatus for processing read image data in a facsimile apparatus, comprising:

setting means for setting plural kinds of image process modes in advance of processing an image, based on image data to be processed;

input means for inputting the image data in page units;

process means for processing the image data input by said input means, using one of the process modes set by said setting means;

judging means for judging if the number of the pages of the image data processed by said process means equals a predetermined number of pages;

discrimination means for discriminating whether or not a recognition process is to be applied to the image data input by said input means; and changeover means for changing over the process mode in which said process means generates data suitable for the recognition process used by said process means to another process mode based on a judgment by said judging means and a discrimination result by said discrimination means.

17. An image processing method comprising:

a setting step of manually setting at least one of plural kinds of image generation modes in advance of generating an image data;

an inputting step of inputting an original image;

a generation step of generating image data based on the original image input by said input step using either the image generation mode set by said setting step or another image generation mode in which image data suitable for a recognition process is generated;

a discrimination step of discriminating whether or not the recognition process is to be applied to the original image input by said input step; and a control step of controlling a changeover of the image generation mode used in said generation step, between the image generation mode set in said setting step and the another image generation mode, in accordance with a discrimination result by said discrimination step, while the image data is generated in said generation step.

18. The method according to claim 17, further comprising a judging step of judging if the amount of image data generated in said generation step equals a predetermined amount, wherein said control step controls the changeover of the generation modes based on a judgment in said judging step and a discrimination result by said discrimination step.

19. The method according to claim 18, wherein said generation step generates image data in page units, and said judging step judges if the number of pages of the image data generated by said generation step equals a predetermined number of pages.

20. The method according to claim 19, wherein said predetermined number of pages is one, and said control step controls to change over the image generation mode used by said generation step between image data of a first page and image data of a second page.

21. The method according to claim 20, wherein the image generation mode used for generating image data of the first page is an image generation mode appropriate to mark sheet reading.

22. The method according to claim 17, wherein said generation step generates image data from image data obtained by reading images.

23. The method according to claim 17, wherein said setting step sets at least one of edge emphasis degree, a threshold level for binarization and a binarization method.

24. The image processing method as recited in claim 17, wherein the image processing method is performed by a facsimile apparatus.

25. An image processing method comprising:

a setting step of setting at least one of plural kinds of binarization modes in advance of binarizing an image data;

an input step of inputting multi value image data;

a binarization step of processing the image data input by said input means using a designated binarization mode;

a judging step of judging if the amount of the image data binarized by said binarization step equals a predetermined amount; and a first discriminating step of discriminating whether or not a recognition process is to be applied to the image data input by said input means; and a changeover step of controlling a changeover of the designated binarization mode used in said binarization step, between the binarization mode set in said setting step and another binarization mode in which binarized data suitable for the recogniation process are generated, based on a judgment in said judging step and a discrimination result by said discriminating step.

26. The method according to claim 25, wherein said setting step sets binarization modes in page units, said input step inputs the image data in page units, said judging step judges if the number of pages of the image data binarized by said binarization step equals a predetermined number of pages, and said changeover step controls the changeover of the binarization mode used in said binarization step, between the binarization mode set in said setting step and the another binarization mode, in page units based on a judgment in said judging step and a discrimination result in said first discrimination step.

27. The method according to claim 26, where said predetermined number of pages is one, and in said changeover step, the binarization mode used in said binarization step is changed over between image data of a first page and image data of a second page.

28. The method according to claim 27, wherein the binarization mode used for processing of the image data of the first page is a binarization mode appropriate to mark sheet reading.

29. The method according to claim 26, where said predetermined number of pages is one, and in said changeover step, the binarization mode used in said binarization step is changed over between image data of a first page and image data of a second page.

30. The method according to claim 25, further comprising a second discriminating step of extracting a predetermined sized partial image from the image data, and discriminating a type of the partial image, wherein in said setting step, at least one of edge emphasis degree, a threshold level in binarization and a binarization method is set based on the type of the partial image discriminated in said second discriminating step.

31. The image processing method as recited in claim 25, wherein the image processing method is performed by a facsimile apparatus.

32. An image processing method for processing read image data in a facsimile apparatus, comprising:

a setting step of setting plural kinds of image process modes in advance of processing an image, based on image data to be processed;

an input step of inputting the image data in page units;

a process step of processing the image data input in said input step, using one of the process modes set in said setting step;

a judging step of judging if the number of the pages of the image data processed by said process step equals a predetermined number of pages;

a discriminating step of discriminating whether or not a recogniation process is to be applied to the image data input in said input said; and a changeover step of changing over the process mode used by said process means to another process mode in which said process step generates data suitable for the recognition process based on a judgment by said judging step and a discrimination results by said discriminating step.

33. An image processing apparatus comprising:
input means for inputting image signals;
first digitizing means for digitizing the image signals input by said input means for a pattern recognition process;
second digitizing means for digitizing the image signals input by said input means for outputting as an image; and
control means for controlling a changeover between said first digitizing means and said second digitizing means based on whether or not the pattern recognition process is to be applied to the image signals input by said input means.

34. The apparatus according to claim 33, wherein said first and second digitizing means binarize the image signals input by said input means.

35. The apparatus according to claim 34, wherein said first and second digitizing means binarize the image signals input by said input means by utilizing different parameters respectively.

36. The apparatus according to claim 33, wherein said first digitizing means digitizes the image signals for recognizing a mark sheet.

37. The apparatus according to claim 33, said second digitizing means digitizes the image signals input by said input means in either a character mode or a picture mode.

38. An image processing method comprising:
an input step of inputting image signals;
a first digitizing step for digitizing the image signals input in said input step for a pattern recognition process;
a second digitizing step for digitizing the image signals input in said input step for outputting as an image; and
a control step of controlling a changeover between said first digitizing step and said second digitizing step based on whether or not the pattern recognition process is to be applied to the image signals input in said input step.

39. The method according to claim 38, wherein said first and second digitizing step binarize the image signals input in said input step.

40. The method according to claim 39, wherein said first and second digitizing step binarizes the image signals input in said input step by utilizing different parameters respectively.

41. The method according to claim 38, wherein said first digitizing step digitizes the image signals for recognizing a mark sheet.

42. The method according to claim 38, said second digitizing step digitizes the image signals input in said input step in either a character mode or a picture mode.

43. A computer readable program stored in a storage medium comprising:

a setting step of setting plural kinds of image process modes in advance of processing an image, based on image data to be processed;

an input step of inputting the image data in page units;

a process step of processing the image data input in said input step, using one of the process modes set in said setting step;

a judging step of judging if the number of the pages of the image data processed by said process step equals a predetermined number of pages;

a discriminating step of discriminating whether or not a recognition process is to be applied to the image data input in said input step; and a changeover step of changing over the process mode used by said process means to another process mode in which the image data is processed to generate data suitable for the recognition process based on a judgment by said judging step and a discrimination result by said discriminating step.

44. A computer readable program stored in a storage medium comprising:

an input step of inputting image signals;

a first digitizing step of digitizing the image signals input in said input step of a recognition process;

a second digitizing step of digitizing the image signals input in said input step for outputting as an image; and a control step of controlling a changeover between said first digitizing step and said second digitizing step based on whether or not the recognition process is to be applied to the image signals input in said input step.

45. A computer readable program stored in a storage medium comprising:

a setting step of manually setting at least one of plural kinds of image generation modes in advance of generating an image data;

an inputting step of inputting an original image;

a generation step of generating image data based on the original image input by said input step using either the image generation mode set by said setting step or another image generation mode in which image data suitable for a recognition process is generated;

a discrimination step of discriminating whether or not the recognition process is to be applied to the original image input by said input step; and a control step of controlling a changeover of the image generation mode used in said generation step, between the image generation mode set in said setting step and the another generation mode image data suitable for the recognition process are, in accordance with a discrimination result by said discriminations step, while the image data is generated in said generation step.

46. A computer readable program stored in a storage medium comprising:

a setting step of setting at least one of plural kinds of binarization modes in advance of binarizing an image data;

an input step of inputting multi value image data;

a binarization step of processing the image data input by said input means using either the binarization mode set by said setting step or another binarization mode in which binarized data suitable for a recognition process is generated;

a judging step of judging if the amount of the image data binarized by said binarization step equals a predetermined amount; and a first discriminating step of discriminating whether or not the recognition process is to be applied to the image data input by said input means; and a changeover step of controlling a changeover of the binarization mode used in said binarization step, between the binarization mode set in said setting step and the another binarization mode, based on a judgment in said judging step and a discrimination result by said discriminating step.

* * * * *

UNITED STATES PATENT AND TRADEMARK OFFICE
CERTIFICATE OF CORRECTION

PATENT NO. : 5,748,774

DATED : May 5, 1998

INVENTOR : YUKIO MURATA

Page 1 of 3

It is certified that error appears in the above-identified patent and that said Letters Patent is hereby corrected as shown below:

ON TITLE PAGE:

[56] References Cited

"2050857  2/1990  Japan
2150861  6/1990  Japan" should read --2-50857 2/1990 Japan   2-150861  6/1990 Japan--.

COLUMN 1 line 6,  "08,051,553" should read --08/051,553--;
line 14, "read original" should read --original--; and
line 55, "upon" should be deleted.

COLUMN 2 line 42, "a example" should read --an example-- and "an" should read --a--.

COLUMN 5 line 22, "and" should be deleted.

COLUMN 7 line 11, "model" should read --mode--; and
line 12, "modification" should read --modifications--.

UNITED STATES PATENT AND TRADEMARK OFFICE
CERTIFICATE OF CORRECTION

PATENT NO. : 5,748,774

DATED : May 5, 1998

INVENTOR : YUKIO MURATA

Page 2 of 3

It is certified that error appears in the above-identified patent and that said Letters Patent is hereby corrected as shown below:

COLUMN 10 line 34,   "recognaition" should read --recognition--; and
   line 59,   Claim 29 should read --The method according to claim 25, wherein said input step reads an original image.--

COLUMN 11 line 21,   "recognaition" should read --recognition--;
   line 22,   "input said;" should read --input step;--;
   line 27,   "results" should read --result--; and
   line 53,   "said" should read --wherein said--.

COLUMN 12 line 11,   "said" should read --wherein said--;
   line 66,   "mode image data suitable for the" should read --mode,--; and

UNITED STATES PATENT AND TRADEMARK OFFICE
CERTIFICATE OF CORRECTION

PATENT NO. : 5,748,774

DATED : May 5, 1998

INVENTORS : YUKIO MURATA

It is certified that error appears in the above-identified patent and that said Letters Patent is hereby corrected as shown below:

COLUMN 12 continued line 67, "recognition process are," should be deleted.

COLUMN 14 line 3, "and" should be deleted.

Signed and Sealed this

Twenty-third Day of March, 1999

Attest:

Q. TODD DICKINSON

Attesting Officer     Acting Commissioner of Patents and Trademarks